United States Patent [19]

Kishishita

[11] Patent Number: 4,880,237

[45] Date of Patent: Nov. 14, 1989

[54] TOKENLESS SLOT MACHINE SYSTEM

[76] Inventor: Ryutaro Kishishita, 109 Yamatecho, Naka-ku, Yokohama, Kanagawa, Japan

[21] Appl. No.: 139,313

[22] Filed: Dec. 29, 1987

[30] Foreign Application Priority Data

Nov. 30, 1987 [JP] Japan .................. 62-302125

[51] Int. Cl.[4] .................. A63F 9/22; A63B 67/00; G06F 15/28
[52] U.S. Cl. .................. 273/138 A; 273/143 R; 273/1 E; 273/85 G; 364/412; 283/903
[58] Field of Search ...... 273/143 R, 138 A, DIG. 28, 273/1 E, 85 G; 364/410–412; 283/903, 901, 82

[56] References Cited

U.S. PATENT DOCUMENTS

| | | | |
|---|---|---|---|
| 4,575,622 | 3/1986 | Pellegrini | 273/138 A |
| 4,636,951 | 1/1987 | Harlick | 273/DIG. 28 |
| 4,689,742 | 8/1987 | Troy et al. | 273/138 A |
| 4,752,068 | 6/1988 | Endo | 273/1 E |

Primary Examiner—Leo P. Picard
Assistant Examiner—Jessica J. Harrison
Attorney, Agent, or Firm—L. Lawton Rogers, III; Joseph M. Killeen

[57] ABSTRACT

A slot machine requiring no game media at all and comprising a game data processing unit which is provided with an input unit for specific data, a storage unit, an arithmetic processing unit, a printer, and a display; and a slot machine body which is provided with a pattern display mechanism, a starting lever, stopping buttons, a win decision unit, and a display for the input data and the results of arithmetic processing. The game data processing unit printer is operative for printing the input data and an incorrect version of the input data on opposing sides of a card and issuing the card to a player for enhanced security. Data that are the same as the specific data input in the data processing unit are input in an input unit for the specific data on the slot machine side so that a game can be started, and the game is allowed to progress or is stopped by operating the specific data input unit on the machine side.

5 Claims, 3 Drawing Sheets

TOKENLESS SLOT MACHINE SYSTEM

BACKGROUND OF THE INVENTION

The present invention relates to a slot machine which does not use any game media like tokens at all.

Conventional slot machines use tokens, coins or balls as forms of "game media".

In other words, the games of conventional slot machines are played by putting in slot machines as game media tokens, balls or certain types of coins which are borrowed from a "game center", and the tokens, balls or certain types of coins are expelled from the slot machines when a game is won.

However, the use of the above-described game media such as tokens, balls or coins requires spaces and equipment for the functions of lending such game media and exchanging money.

In addition, since it is indispensable for each of slot machines installed in a game center to be provided with a carrier means for receiving the tokens or balls put in them as game media, calculating them, and transferring them to other places from the inside of the machine; a storage means for preparing in advance the game media to be expelled from the slot machine at the time of winning; an expulsion means; and a calculating means for calculating the amount of game media expelled, there are problems in that the structure of each slot machine becomes complicated, and the external shape of the slot machine itself easily becomes large in size. This is because almost all the above-described means which need to be provided in the body of a slot machine are mechanical structures or mechanical/electrical structures.

Furthermore, the concentrated control of the game media put in a plurality of slot machines and the game media expelled therefrom in a game center requires a central control mechanism for game media which discharges the game media from each slot machine and supplies them thereto. Therefore, there is a problem in that the scale of a game center having slot machines is easily increased, both from the viewpoint of equipment and that of man power.

SUMMARY OF THE INVENTION

In consideration of the above-mentioned problems of the conventional slot machines, the present invention has been achieved with a view to providing a slot machine which requires no game media at all and thus from which all means for storing and transferring the game media, whether having a mechanical structure or a mechanical/electrical structure, may be omitted. A slot machine of the present invention comprises a game data processing unit which is provided with an input unit for specific data such as a code number, a storage unit in which the specific data input are readably stored, an operation unit for performing arithmetic processing of the input data, a printer for printing out necessary data in the input data, and a display for displaying the input data and arithmetic data; and a slot machine body which is provided with a pattern display mechanism comprising three or more reels on which patterns are displayed or CRTs which display similar to those on the reels, a start means for starting the pattern display mechanism for changing the displayed patterns, a stop means for stopping the operation of changing the patterns of the pattern display mechanism, a win decision unit for deciding whether or not a pattern line on a winning line of the pattern display mechanism stopped wins the game and supplying the output to the data processing unit, a display for displaying the input data of the input unit for specific data such as a code number and the results of the arithmetic processing performed in the game data processing unit; data that is the same as the specific data input in the data processing unit being input in an input unit for specific data on the slot machine side so that the game can be started, and the game being allowed to progress or being stopped by operating the specific data input unit on the machine side.

The input of the specific data and the printout of a game card in the game data processing unit correspond to the action of borrowing game media, the input of the specific data in the input unit corresponds to the selection of a slot machine and the action of setting the start of a game in this machine.

DETAILED DESCRIPTION OF PREFERRED EMBODIMENT

An embodiment of the present invention is described below with reference to the drawings.

Figure 1:
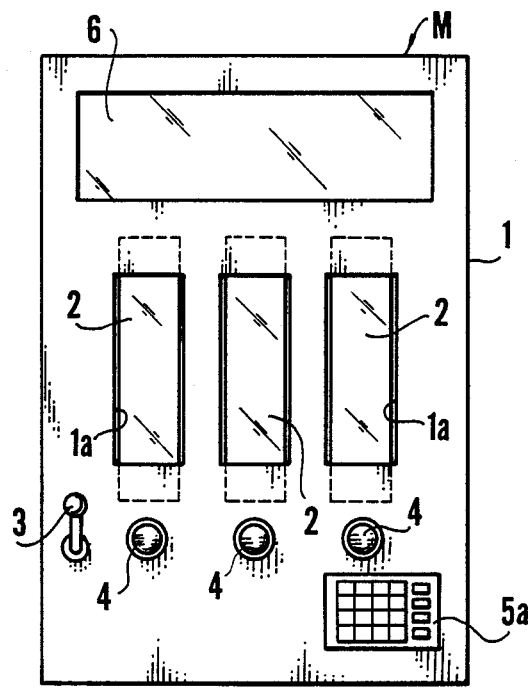
FIG. 1 is a front view of a slot machine body of the slot machine of an embodiment of the present invention.
Figure 3:
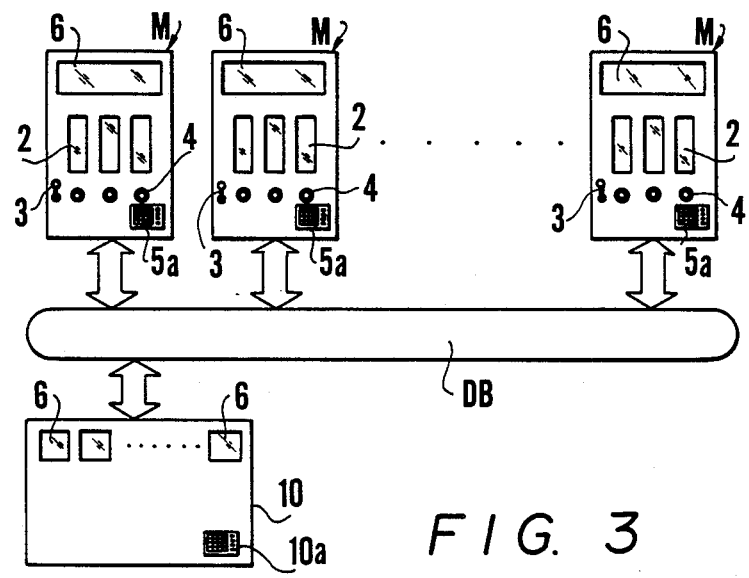
FIG. 3 is a block diagram of an embodiment in which are provided a plurality of the slot machines of the present invention.
Figure 2A:
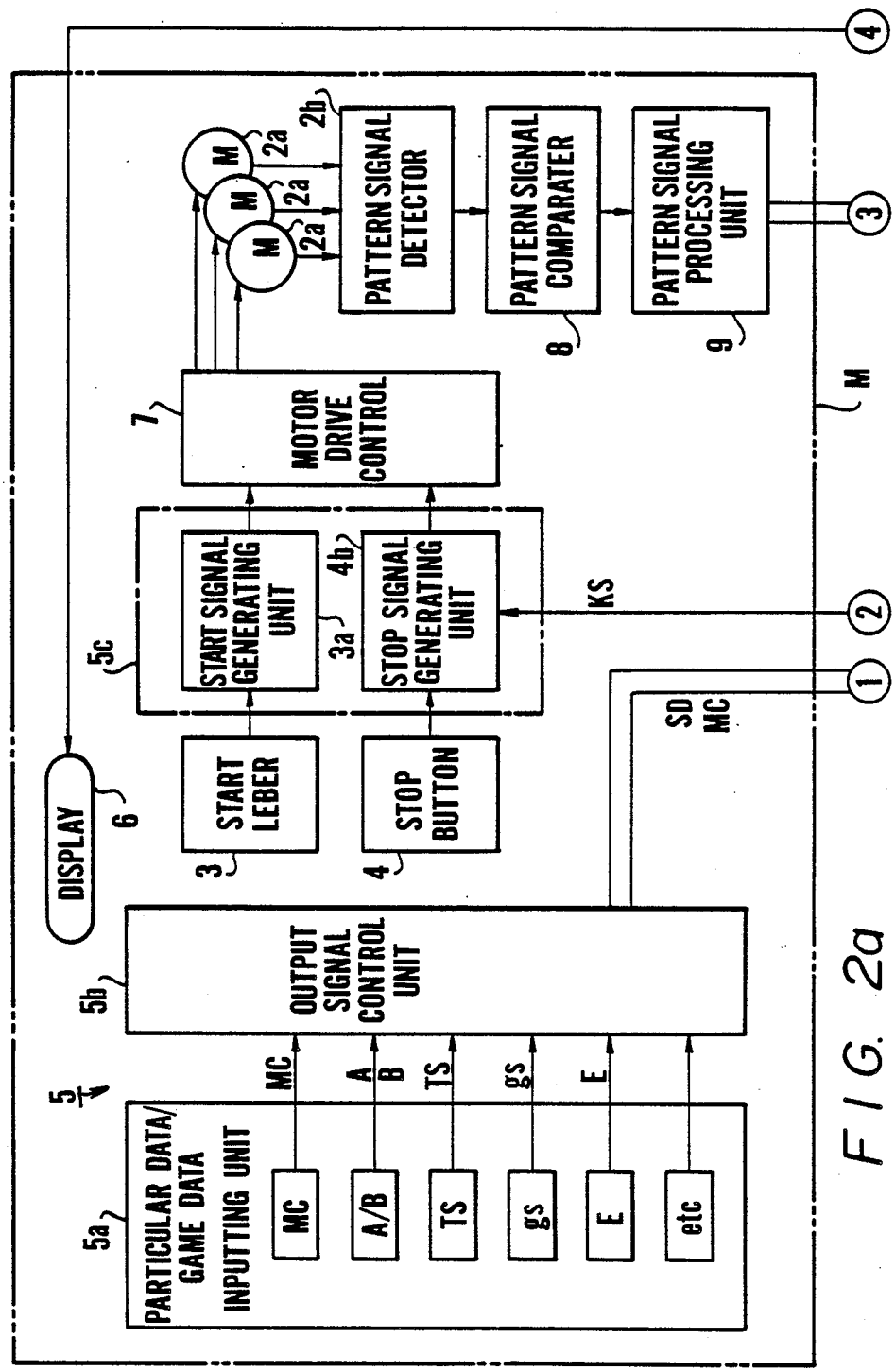
FIG. 2a is a block diagram of the slot machine of the embodiment of the present invention.
Figure 2B:
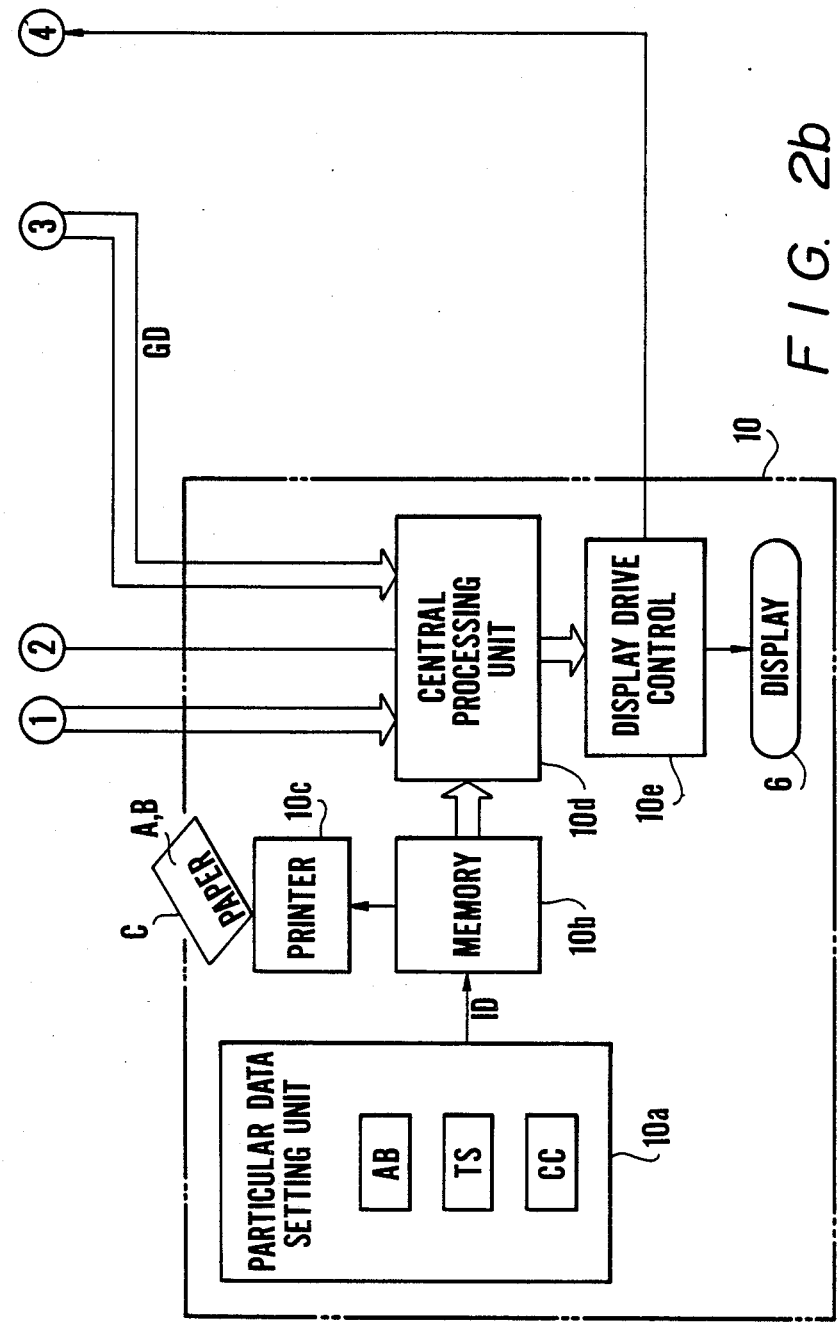
FIG. 2b is a block diagram of the game data processing unit of the embodiment of the present invention.

FIG. 1 is a front view of a slot machine body of the slot machine of an embodiment of the present invention, Fig. 2 is a block diagram of the slot machine of the embodiment of the present invention, and FIG. 3 is a block diagram of an embodiment in which a plurality of the slot machines of the present invention are provided.

In FIG. 1, reference numeral 1 denotes an external case of a slot machine body, and reference numeral 2 denotes three reels which are provided in the external case 1 so as to face reel windows 1a provided in the external case 1. A pattern such as an appropriate character or figure is displayed on each of the reels 2 which are respectively rotated by a motor 2a in this embodiment so that the pattern seen from each of the reel windows 1a is changed.

A pattern display mechanism and pattern changing mechanism which comprise the above-described reels 2 an motors 2a may be replaced by mechanisms using CRTs or liquid crystal elements.

Reference numeral 3 denotes a start lever which is provided in front of the external case 1, and reference numeral 4 denotes stop buttons which are provided to correspond to the three reels 2. All the reels 2 are started to rotate by operating the start lever 3, and each of the reels 2 is stopped by operating each of the stop buttons 4.

Reference numeral 5 denotes a ten-key board which is provided near the stop buttons 4 which forms a specific data input unit on the slot machine body side in the present invention.

Reference numeral 6 denotes a display which is provided above the reels 2 at the front of the external case 1 and displays necessary data in the data input in the specific data input unit 5, the states of slot machine, i.e.

usable or unusable, or the ratio of wins in the past games.

As shown in FIG. 2, signal generating units 3a, 4a for the start lever 3 and the stop buttons 4, respectively, are connected to a motor control circuit 7 and generate trigger signals to the control circuit 7 whereby the circuit 7 supplies control signals for starting or reducing and stopping the rotation of each motor 2a.

A pattern signal detector 2b for detecting a pattern on the winning line of each of the reels 2 when each motor is stopped is connected to each of the motors 2a, and the detection signal from the pattern signal detector 2b is supplied to a win decision unit 8 so as to be compared with a winning signal which has been previously written in this decision unit 8. The decision signals of the decision unit 8 include a signal indicating a win and a signal indicating a loss, these signals controlling the drive of a decision signal processing unit 9.

The output from the processing unit 9 is supplied to a game data processing unit 10 described below in which the output is subjected to arithmetic processing.

The game data processing unit 10 comprises a specific data input unit 10a which is formed by a ten-key board; a storage unit 10b for readably writing and storing the data signals formed by the data input unit 10a; a printer 10c for printing out in an appropriate card C key data from the data written in the storage unit 10b which are necessary for performing a slot game, such as a keyword or a code number; an arithmetic processing unit 10d for performing comparing operations of game data supplied from the storage unit 10b and from the decision signal processing unit 9, i.e. data SD set for playing a game and data GD with respect to winning and consumption of game media; and a display drive unit 10e for driving the display 6.

On the other hand, a specific data input unit 5 provided in the slot machine body M comprises an input unit 5a which is formed by a ten-key board; a control output unit 5b for supplying to the data processing unit 10 signals indicating data such as the specific data input in the input unit 5a, for example, the code number output in the card C by the printer 10c and the number of game media bet on a game or the amount of money equivalent thereto, or an address number applied to the slot machine; and an operation control unit 5c for controlling the start lever 3 and the stop buttons 4 by using a control signal KS output from the operation unit 10d in which the signals from the output unit 5b are compared with the data stored in the data processing unit 10.

A description will now be made of an example of use of this embodiment of the slot machine of the present invention configured as described above.

At first, a person who wants to play a slot game pays the money to be used for the slot game at the game data processing unit 10 (generally provided at a reception desk of a game center).

The game center which receives the money writes as data ID specific to the person data which indicate a code number A and the number B of games which can be played with the amount of money paid or the number TS of game media corresponding to the amount of money paid in the storage unit 10b by operating the input unit 10a.

When specific data ID are written in the storage unit 10b by operating the input unit 10b, the data ID are once stored in the storage unit 10b, and the card C in which data such as the code number A and the number B of games or data equivalent thereto are written is printed out from the printer 10c. Two different code numbers A are respectively printed on the face and back of the card C in order to avoid surreptitious glances of other persons.

The person receives the card C, goes to the slot machine M, and inputs the code number A, a machine code MC of the machine which the person wants to use and the number TS of game media to be used in the machine or number B of games by operating the input unit 5a of the machine. The input data are supplied as set data SD for the slot game to the arithmetic processing unit 10d in the data processing unit 10, and, when the set data SD are sent to the arithmetic processing unit 10d, data necessary for the game from the data ID previously stored in the storage unit 10b are stored in the arithmetic processing unit 10d using the machine code MC as an address signal.

The arithmetic processing unit 10d outputs signals to the operation control unit 5c for driving the start lever 3 and the stop buttons 4 so that they can be operated and can supply signals to the motor control unit 7, under the conditions that the code number A input from the input unit 10a coincides with the code number A input from the input unit 5a in the slot machine M, and that game media or items equivalent thereto are actually recorded.

In this state, since the slot machine M can be used as a game machine, the person who wants to play games starts a game by setting a numerical value gs indicating the number of game media in place of the putting of the game media bet on each game in the input unit 5a of the slot machine M. For example, the person sets the number of media gs bet on each game in the input unit 5a by operating it, and then pushes the start lever 3 and operates the stop buttons for each game so that the slot machine games are successively allowed to progress.

During the progress of games, the motor 2a of each reel 2 is rotated and stopped for each game, and a pattern line of each reel 2 is detected by the signal detector 2b at each time the motor 2a is stopped. The win decision unit 8 makes the decision of whether or not the detected signal wins the game.

The decision unit 8 supplies as data with respect to the results of games a signal indicating the number of game media to be expelled in accordance with the winning place at each time of a win and a signal indicating a loss to the arithmetic processing unit 10d.

The arithmetic processing unit 10d calculates the number of the present game media, i.e. the number of the remaining game media, by adding the data of the game results to or subtracting it from the initial number of game media TS in the game data previously stored. The result of the calculation is displayed on the display 6 through the display drive circuit 10e.

The arithmetic processing unit 10d also calculates, for example, each of the total values of the numbers of the game media put in the games and the numbers of the game media expelled at the times of wins and the ratio between the two total values, the number of games and the number of the times of wins during the games, or the ratio between the two numbers. The results of these calculations are displayed on the display 6.

The games of the slot machine M are stopped when the numerical value indicating the number of the present game media which in the arithmetic processing unit 10d becomes zero, or when the person playing the games operates a stop key E in the input unit 5a in the state wherein some game media are present.

When the stop key is operated in the state wherein some game media are present, a signal indicating the termination is supplied to the data processing unit 10, and the number of the remaining media in the operation unit 10d and the initial code number A are printed out, as well as only the number of the remaining media being displayed on the display 6. On the other hand, the data stored in the storage unit 10b and the arithmetic operation unit 10d are cleared or transferred together with the machine code MC of the machine to other places and stored therein.

The person who finishes the games receives the card C in which the number of the remaining media and the original code number A are printed out and goes to another slot machine and plays slot machine games in accordance with the number of the remaining media in the same way as the above-described embodiment, or exchanges the remaining media for premia.

As shown in FIG. 3, a plurality of the above-described slot machines can be connected to the game data processing 10 in a place and controlled in a concentrated manner. In this case, it is a matter of course that the capacity of the game data processing unit 10 corresponds to the number of the slot machines provided. DB shown in FIG. 3 denotes a data bus.

Since, as described above, the games of the slot machine of the present invention can be played without any game media being used, the mechanical structure of the machine is extremely simplified, the production cost is reduced, and the maintenance does not take much time.

In addition, since no read unit for game data is provided on the slot machine side, there is an advantage with respect to no occurrence of problems caused by the read unit.

The present invention is therefore very useful as a slot machine.

What is claimed is:

1. A slot machine system comprising:
    a game data processing unit which is provided with:
    an input unit having a keyboard for inserting input data, said input data including a user's identification code and number of game media available for wagering,
    a storage unit in which said input data is readably stored,
    an operation unit for performing arithmetic processing of said input data,
    a printer for printing said input data and an incorrect version of said input data on opposing sides of a card, said printer being able to provide the card to a user, and
    a first display for displaying said input data and the results of said arithmetic processing; and a slot machine body which is provided with:
    a pattern display mechanism comprising three or more second displays on which patterns are displayed,
    a start means for changing said patterns,
    a stop means for stopping the changing of said patterns,
    a win decision unit for deciding whether a pattern line of said stopped pattern display mechanism wins a game and for supplying the output to said data processing unit,
    a write unit for recording said input data and the results of said arithmetic processing performed in said game data processing unit, and
    a data entry unit having a keyboard for receiving entered data including a user's identification code and a number of game media to be wagered by the identified user, said number of game media to be wagered not being predetermined by said system, whereby said fame can be started when the identification code in said input data corresponds to the identification code in said entered data and the number of game media to be wagered is no more than the game media available for wagering.

2. The slot machine system as defined in claim 1 wherein said second displays comprise mechanical reels.

3. The slot machine system as defined in claim 1 wherein said second displays comprise cathode ray tubes.

4. The slot machine system as defined in claim 1 wherein said second displays comprise liquid crystal elements.

5. A slot machine system for processing wagers of game media on plural slot machines and accounting gains and losses of the game media without using tokens such as coins or balls, and without using portable memory devices such as magnetically encoded cards, the system comprising:
    (a) a game data processing unit for coordinating the functions of the system and for initializing the system to allow identified plays to wager game media on the slot machines in the system, said processing unit comprising:
    a first keyboard for entering game data including player identification codes and the number of game media credited to the identified player,
    a storage unit for readably writing and storing the game data entered at said first keyboard;
    a printer for printing game data from said storage unit, said printer having means for printing a false player identification code and a correct player identification code on opposing sides of a paper, said printer being capable of providing said paper to the identified player;
    an arithmetic processor connected to said storage unit and to the slot machines in the system, said arithmetic processor having means for:
        (1) comparing game data from the storage unit and from the slot machines in the system,
        (2) enabling operation of a first one of the slot machine sin the system responsive to said means for comparing game data when the player identification code in said storage unit matches the player identification code in said first one of the slot machines in the system and when sufficient game media are credited to the identified player to meet the number of game media wagered by the identified player, and
        (3) updating game media available to identified players based on inputs from slot machines in the system; and
    (b) plural slot machines connected to said game data processing unit for wagering game media, each of said slot machines comprising:
    a second keyboard for entering play data including player identification codes and the number of game media to be wagered by the identified player, the number of game media to be wagered not being predetermined by the system;
    wagering means for making a wager and for determining the game media payoff from a wager;
    an operation control unit responsive to said means for enabling operation for enabling operation of the wagering means; and
    means for transmitting the payoff from a wager to said means for updating game media.

* * * * *